United States Patent [19]

Knepler

[11] 4,164,669
[45] Aug. 14, 1979

[54] SEED SENSOR
[75] Inventor: John T. Knepler, Chatham, Ill.
[73] Assignee: Dickey-john Corporation, Auburn, Ill.
[21] Appl. No.: 612,017
[22] Filed: Sep. 10, 1975
[51] Int. Cl.² .............................................. H02K 35/00
[52] U.S. Cl. ........................................ 310/15; 310/25; 111/1; 221/7
[58] Field of Search ................... 111/1; 340/239, 259; 221/7; 222/23; 23/98; 310/15, 25

[56] References Cited
U.S. PATENT DOCUMENTS

| | | | |
|---|---|---|---|
| 2,907,015 | 9/1959 | Young | 340/239 |
| 2,914,246 | 11/1959 | Beamish | 235/98 |
| 3,355,102 | 11/1967 | Gregory, Jr. | 221/7 X |
| 3,422,776 | 1/1969 | Gregory, Jr. | 111/1 X |
| 3,723,989 | 3/1973 | Fathaner et al. | 340/259 |
| 3,772,541 | 11/1973 | Campagnnolo et al. | 310/15 |

Primary Examiner—Donovan F. Duggan
Attorney, Agent, or Firm—Trexler, Wolters, Bushnell & Fosse, Ltd.

[57] ABSTRACT

A seed sensor for sensing seeds flowing along a path is provided with an electromagnetic transducer having a movable diaphragm. An arm is secured to a generally peripheral portion of the diaphragm and extends into the seed flow path to be struck at random by the seeds. The arm has a portion operatively engageable with a mid portion of the diaphragm and functions as a mechanical amplifier to actuate the diaphragm when struck by the seeds for producing usable output signals.

12 Claims, 7 Drawing Figures

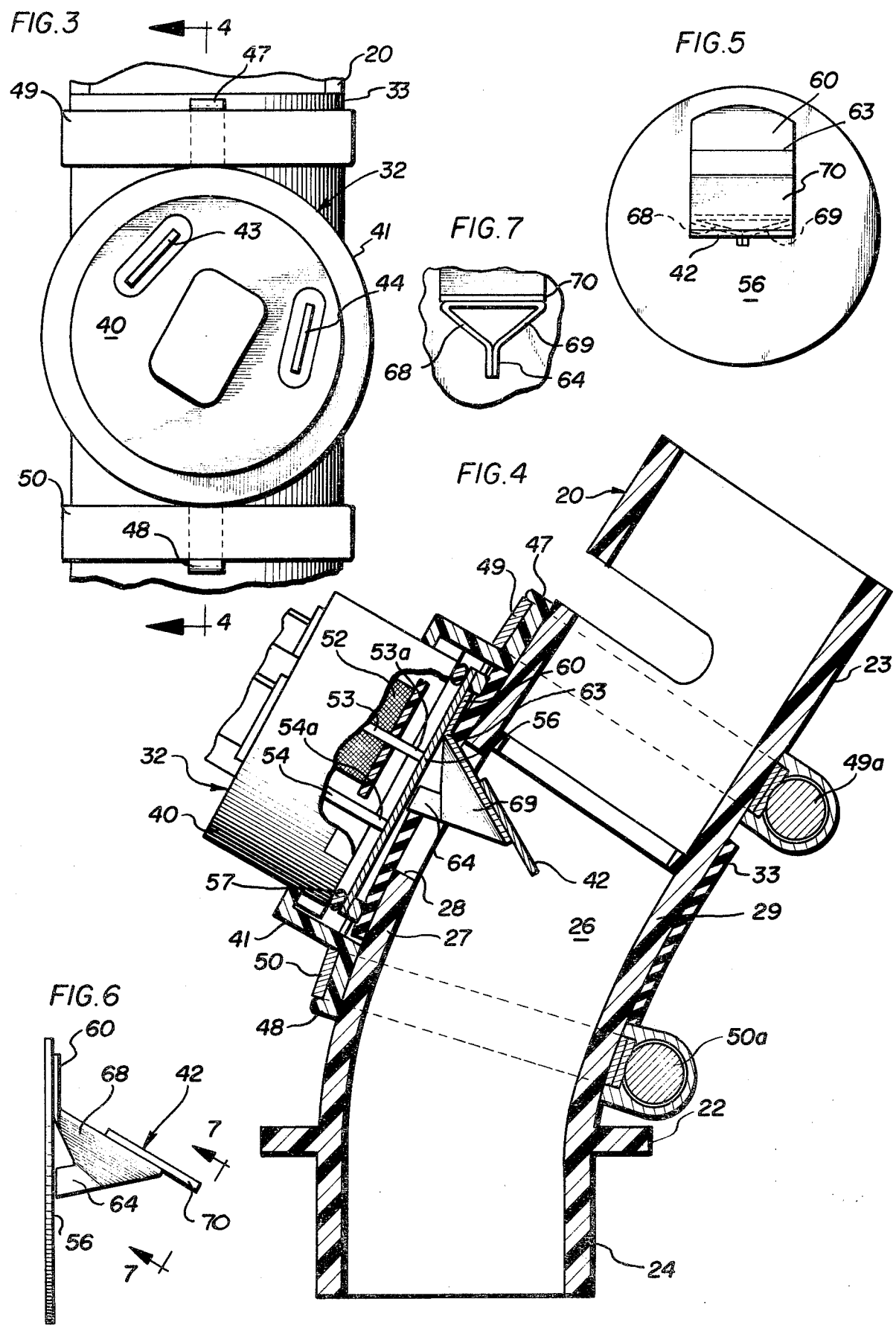

SEED SENSOR

BACKGROUND OF THE INVENTION

The present invention relates to sensors, and more particularly to a novel sensor used for sensing seeds being planted by means of a multi-row seed planter. While certain features of this invention may be adapted for many different uses, the disclosure will be facilitated by directing it particularly to the problems of monitoring seeds being discharged from a multi-row seed planting machine.

As is well known in the agricultural industry, a farmer engaged in mechanized planting of various seeds utilizes planting machines pulled behind tractors or other such vehicles. Such planters usually include a plurality of separate planting devices supplied with seeds either from separate hoppers or from a single large hopper. The seeds are distributed by various mechanisms from the hopper or hoppers to the planting devices which are arranged to direct the seeds into the ground in a plurality of rows. Seed planting apparatus used in fields are subjected to severe environmental conditions including dust, moisture, temperature and the like which along with normal wear and tear may cause a malfunction in the planter apparatus. Therefore, seed detecting equipment has been suggested and such equipment should be able to withstand the adverse conditions under which they are utilized. Because of the nature of the environment in which seed detectors are utilized, they are required to be replaced from time to time. Therefore, it is also important that the sensor, while being as durable as possible, be made in a manner to facilitate replacement in the field when necessary.

SUMMARY OF THE INVENTION

Accordingly, it is an object of this invention to provide a simple and durable seed sensor for use in seed planting apparatus to produce output signals in response to seeds striking the sensor.

Another object of this invention is to provide a new and improved seed sensor structure which is readily replaced from the seed dispenser without dismantling the seed dispenser.

Still another object of this invention is to provide a new and improved seed sensor which is free of moving contacts such as switch contacts and the like and which produces output signals upon seeds striking the sensor.

Briefly, a seed sensor incorporating features of this invention includes a conduit section forming a segment of a seed flow path. A transducer is secured to the conduit section on the outside wall thereof and held in place by a pair of diametrically opposed tabs which are engaged by clamps surrounding the conduit section. When the transducer is to be replaced, the clamps are released from the tabs. A new transducer is then placed in position and secured by using the same or replacement clamps. The transducer is an electromagnetic device having a metal diaphragm having magnetic properties. Movement of the metal diaphragm causes a change in flux to occur in the magnetic transducer thereby producing an output signal. In order to increase deflection of the diaphragm in response to the passage of seeds, an arm is secured to the diaphragm and extends into the seed flow path to be struck by seeds moving therealong. The arm has an end portion secured to the margin of the diaphragm and an abutment or force transmitting portion engaging a mid portion of the diaphragm. The arm is cantilevered in configuration. Preferably the arm is formed from a thin sheet of metal having side portions of substantially the same configuration and folded beneath the arm to form the abutment portion engaging the center of the diaphragm.

Many other objects, features and advantages of this invention will be more fully realized and understood from the following detailed description when taken in conjunction with the accompanying drawings wherein like reference numerals throughout the various views of the drawings are intended to designate similar elements and components.

BRIEF DESCRIPTION OF THE DRAWINGS

FIG. 3 is an end view of the seed sensor of this invention;

FIG. 4 is a sectional view taken along line 4—4 of FIG. 3 and showing the curved conduit portion in its entirety;

FIG. 5 is a plan view of the diaphragm and arm utilized with the sensor of this invention;

FIG. 6 is a side view of the diaphragm and arm shown in FIG. 5; and

FIG. 7 is an end view taken along line 7—7 of FIG. 6.

DETAILED DESCRIPTION OF THE ILLUSTRATED EMBODIMENT

Figure 1:
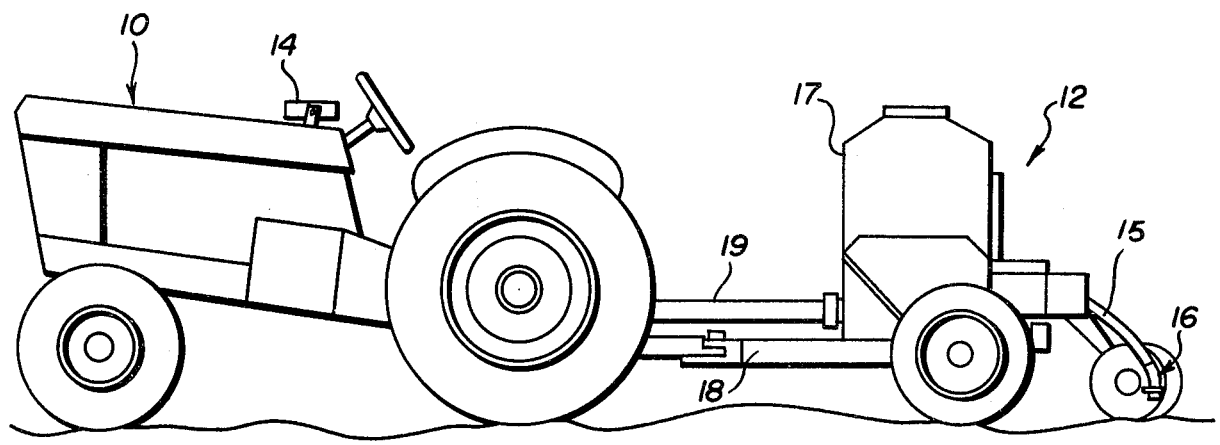
FIG. 1 is a side elevational view of a seed planter and tractor wherein a seed sensor of the present invention is utilized.

For a better understanding of the present invention, the environment in which it is used is illustrated. FIG. 1 shows a tractor 10 for pulling a multi-row seed planter 12. Preferably, monitor means 14 is secured to the tractor for indicating to the operator the operating condition of a plurality of seed sensors which are designated generally by reference numeral 16 and connected to the ends of feed lines 15. In the illustrated planter, there may be as many as 28 seed dispensers and seed sensors to plant 28 parallel rows of seeds. The seed planter 12 has a single large common hopper 17 from which seeds are distributed to the plurality of dispensers 16 of the planter. The planter 12 is secured to the tractor by a tow bar connection 18. Operating power to the planter 12 is obtained from a drive shaft 19. However, it will be understood that operating power to the planter 12 may be obtained through hydraulic cable lines fed by a hydraulic pump operated from the tractor engine. In that case, the operating connection between the tractor and the planter will be the hydraulic lines. Further, the sensors 16 of this invention may be used with any type of planter having means defining a flow path or conduit for the seeds.

Figure 2:
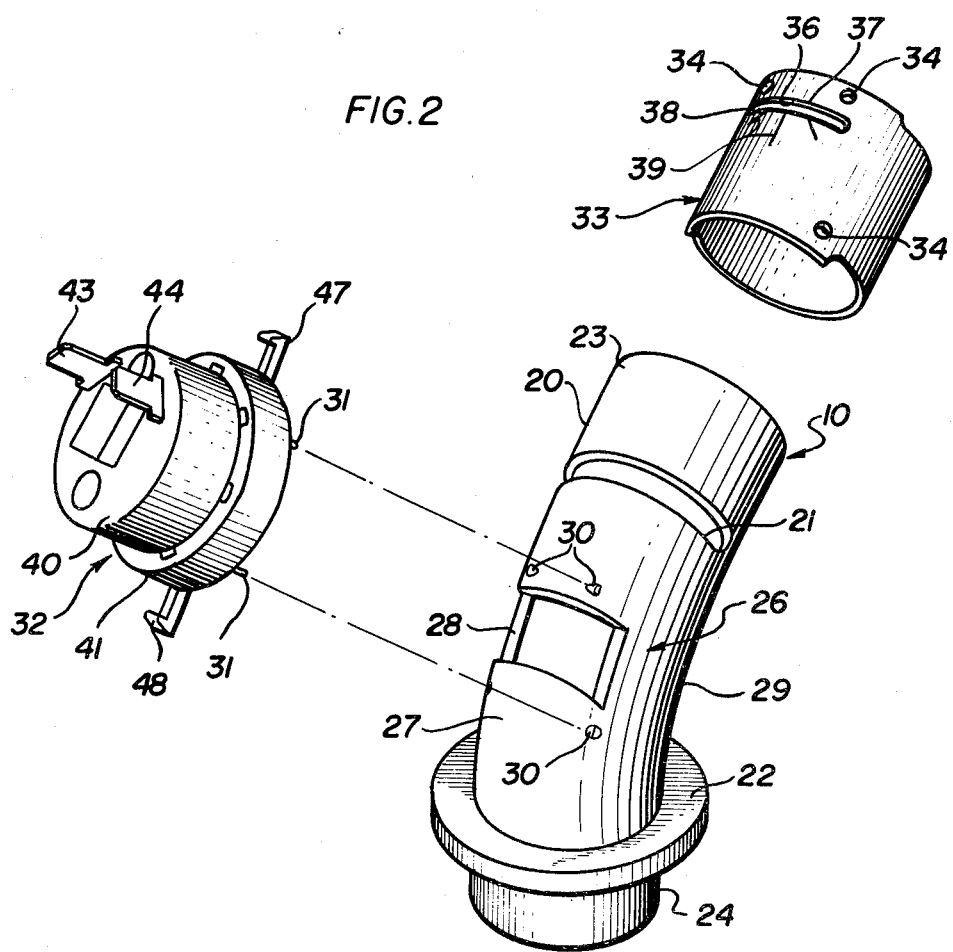
FIG. 2 is an exploded perspective view of a seed sensor constructed in accordance with this invention.

Referring now to FIG. 2, the details of construction of the seed sensor 16 are illustrated. The sensor 16 includes a conduit section or portion 20 which forms an aritcle flow path therethrough. The conduit portion 20 is placed in communication with the line 15 shown in FIG. 1 extending from the distributor means of the planter 12. An arcuate slot 21 is formed in the upper portion of the conduit portion 20 for receiving clamp means, not shown, to enable the sensor to be secured to the distribution line 15, FIG. 1. The other end of the conduit 20 has a circular flange 22. The conduit 20, therefore, is comprised of first and second straight portions 23 and 24 and an intermediate curved portion 26. The curved portion 26 has an outside curved wall 27 in which is formed a rectangular aperture 28.

Alignment detents 30 are formed above and below the rectangular aperture 28 to receive alignment pins 31 associated with an electromagnetic transducer means 32. A rubber boot or sleeve 33 has apertures 34 formed therein to receive the alignment pins 31 on the outer housing of the transducer means 32. When the rubber boot 33 is placed over the curved portion 26 of the conduit, the apertures 34 register with the detents 30. The boot 33 has a slot 36 formed therein having an upper margin 37 which is continuous from end to end. A lower margin 38 of the slot 36 is provided with three incisions 39 to receive an actuating arm of the transducer as described below. The boot 33 provides a substantially air tight seal about the aperture 28 when the transducer 32 is secured to the conduit 20.

The transducer 32 includes a circular housing portion 40 which receives a locking ring or flange 41 to maintain the transducer in an assembled position. A pair of radially outwardly directed tabs 47 and 48 are formed either on the housing 40 or on the ring 41 and are placed over the conduit section 20 to receive clamps 49 and 50, securing the transducer 32 in position over the aperture 28 as shown in FIG. 3. In the illustrated embodiment, the tabs 47 and 48 are formed as an integral part of the assembly ring 41. The clamps 49 and 50 may be of the hose clamp type which progressively decrease in diameter by rotation of threaded screw shafts 49a and 50a, as best seen in FIG. 4. The screw shafts 49a and 50a may have tool accommodating end portions or enlarged hand gripping portions at one end thereof, not shown, to enable the clamps to be loosened or tightened by hand if necessary.

Most advantageously, the transducer 32 of this invention is of the electromagnetic type and includes a permanent magnet 55 conventionally placed at the rear of transducer 32, as shown in FIGS. 2, 3 and 4 and a coil 52 secured to a metal member 53 preferably of a soft iron, or the like, to be electromagnetically coupled thereto. A second magnetic member 54 is positioned adjacent the coil. Ends 53a and 54a of the magnetic members 53 and 54 are placed in close proximity to a diaphragm 56 peripherally fixed to and traversing the end of the housing 40. As the diaphragm 56 flexes toward and away from the ends 53a and 54a, the magnetic flux path between the ends changes and an output signal is sensed by the coil 52. This output signal is applied to terminals 43 and 44 which are connected by suitable wires, not shown, to the monitor apparatus 14. The terminals are preferably of known quick-connect construction. The diaphragm 56 is peripherally held in position by the securing ring 41. An O-ring 57 engages the inner marginal surface of the diaphragm and provides a seal between the diaphragm and the annular wall of the housing 40.

An arm or article engaging element 42 extends from the transducer 32 and through the aperture 28 when the transducer is assembled to the conduit 20. The article engaging element or arm 42 is secured to the diaphragm in the manner described below and angles downwardly into the path of seed flow. Seeds passing through the conduit section 20 will strike the article engaging member or arm 24 at random points along the length thereof and the impact force of each seed is transmitted to the diaphragm in a manner to obtain a desired deflection sufficient to produce a reliably usable output signal.

The article engaging element or arm 42 is secured at an end 60 thereof to the marginal portion of the diaphragm 56 and extends outwardly at an angle over a mid portion of the diaphragm. The arm carries an abutment or force transmitting portion 64 adjacent a free end thereof. The abutment portion 64 projects toward and is positioned for engagement with a mid portion of the diaphragm. Seeds which strike the arm element cause flexure thereof along a bend line 63 at the fixed end 60 and thereby force the abutment portion 64 against the center of the diaphragm 56. This causes maximum flexure of the magnetizable metal diaphragm for any given point of seed impact along the length of the arm 42 which, in turn, flexure causes changes in magnet flux lines for producing a reliable output signal.

For a better understanding of the construction of the diaphragm and article engaging member 42, reference is now made in FIGS. 5, 6 and 7. The diaphragm 56 is here illustrated as circular in configuration, but it will be understood the diaphragm can take other configurations. The end portion 60 is secured to the diaphragm 56 by spot welding or the like. Side portions 68 and 69 of substantially the same configuration are bent toward one another underneath the top of the unit and come together to form the portion 64. In the illustrated embodiment, an extension element 70 is secured to the bent portion. However, it will be understood that the entire unit can be made from a single piece of material and fashioned as shown in the drawings.

While a single specific embodiment of the present invention has been illustrated herein, it will be understood that variations and modifications may be effective without departing from the spirit and scope of the novel concepts as set forth in the following claims.

The invention is claimed as follows:

1. A sensor comprising: means forming an article flow path, transducer means positioned adjacent to said flow path means, said transducer including a resiliently deflectable member having fixed opposite portions and a deflectable mid-portion, article engaging and transducer actuating means secured to said transducer, said article engaging means having a portion engageable with one of said fixed portions and a second portion engageable with said mid-portion for maximizing actuation of the deflectable member and extending partially into said flow path means so that articles passing along said flow path will strike said article engaging means to deflect the same and actuate said transducer means for producing an output signal in response to said deflection.

2. A sensor as set forth in claim 1 wherein said article engaging means is positioned at an angle with regard to the direction of flow through said article flow path, said article engaging means extending substantially in the direction of flow.

3. A sensor as set forth in claim 1 wherein said flow path means has first and second straight portions and a curved portion therebetween, said transducer means being positioned at said curved portion.

4. A sensor as set forth in claim 3 wherein said transducer means is secured to an outside curve of said curved portion and said article engaging means extends into said flow path toward an inside curve of said curved portion and in the direction of flow.

5. A sensor as set forth in claim 1 wherein said transducer means is an electromagnetic transducer including magnet means, means responsive to the change in magnetic flux of said magnet means, said deflectable member comprising a diaphragm positioned adjacent said magnet means, and said article engaging means being secured to said diaphragm for causing movement thereof which, in turn, changes the magnetic flux of said magnet means to produce said output signal.

6. A sensor as set forth in claim 5 wherein said article engaging means comprises an arm having a first end secured to a margin of said diaphragm and extending angularly therefrom into said flow path, said arm having a portion offset from said first end thereof directed toward and engaging a mid portion of said diaphragm.

7. A sensor as set forth in claim 5 wherein said article engaging means comprises an arm of sheet metal having one end bent and secured to a margin of said diaphragm and two side portions of similar configurations angularly disposed and coming together beneath said arm to form an abutment which engages said diaphragm inwardly of said margin.

8. A sensor as set forth in claim 7 wherein said side portions forming said abutment engage said diaphragm at the center thereof.

9. A sensor as set forth in claim 1 wherein said flow path means has an aperture formed therein, said transducer means being removably secured to said flow path means, said article engaging means extending through said aperture into said flow path means, oppositely directed tabs extending from said transducer means, and clamp means engaging said tabs for removably securing said transducer means to said flow path means.

10. A sensor as set forth in claim 9 further including resilient means positioned about said flow path means and having an aperture formed therein to be in registry with the aperture formed in said flow path means, said resilient means forming a seal about said aperture.

11. A sensor for assembly with a seed planter comprising; conduit means forming a segment of a seed flow path for seeds being planted, transducer means secured to said conduit means for generating signals indicative of seed flow through said conduit means, said transducer means including a peripherally fixed deflectable diaphragm, means fixed to said diaphragm and extending into said flow path for engagement by said seeds and for deflecting said diaphragm in response to such engagement to cause said transducer means to produce an output signal.

12. A sensor as set forth in claim 11 wherein said transducer means is an electromagnetic transducer including magnet means, means responsive to the change in magnetic flux of said magnet means, said diaphragm being a metallic diaphragm positioned adjacent said magnet means, and said article engaging means comprising an arm having one end secured to a margin of said metallic diaphragm and an abutment engaging a mid portion of the diaphragm.

* * * * *